Nov. 1, 1955 P. L. THIES 2,722,037
FISH SCALER
Filed April 17, 1953
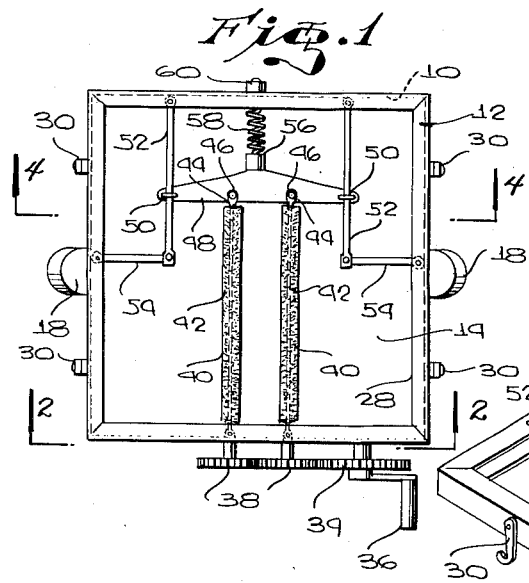
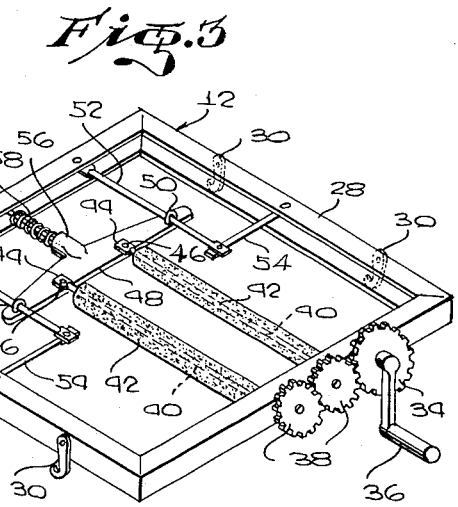
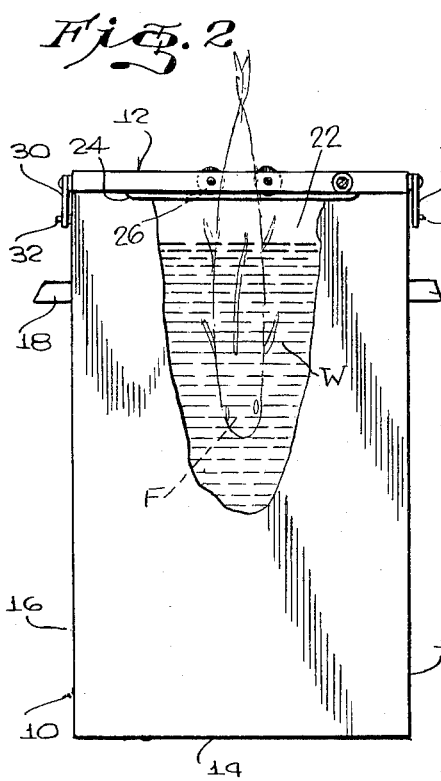
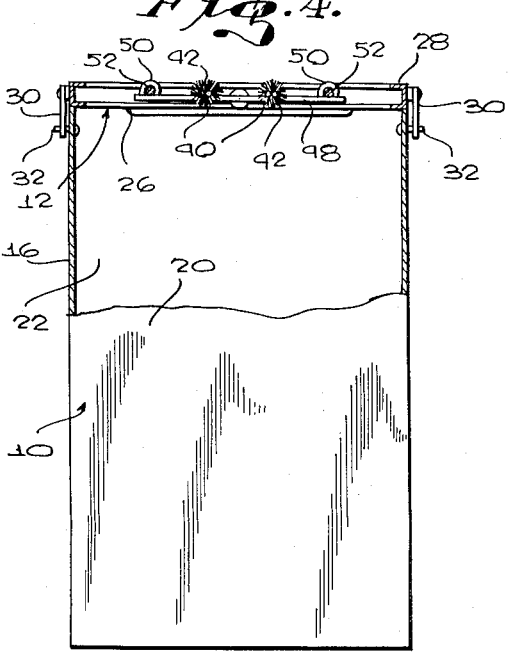
INVENTOR.
PATRICK L. THIES
BY
McMorrow, Berman & Davidson
ATTORNEYS

2,722,037

FISH SCALER

Patrick L. Thies, Cheektowaga, N. Y.

Application April 17, 1953, Serial No. 349,346

4 Claims. (Cl. 17—5)

This invention relates to a fish scaling device.

It is one important object of the present invention to provide an improved device of the character referred to, which will accommodate fish of various sizes during the scaling thereof.

Another object of importance is to provide a scaling device of the type stated which will be simply constructed, and readily operated by hand.

Another object is to provide a scaling device which can be removably associated with a conventional tub or bucket, whenever it is to be used.

Another object of importance is to provide a fish scaling device in which scaling brushes embodied therein will be of flexible construction, and while being rotatably mounted, will yet be spreadable when a fish of substantial girth is inserted therebetween, the scaling device including means for automatically returning the brushes to a normal, parallel relationship.

Still another object is to provide a fish scaler wherein the brushes will be mounted for rotation in opposite directions, and will be simultaneously rotated by a user, the brushes being so arranged as to efficiently scale a fish in a minimum of time.

Other objects will appear from the following description, the claims appended thereto, and from the annexed drawing, in which like reference characters designate like parts throughout the several views, and wherein:

Figure 1 is a top plan view of a fish scaling device formed in accordance with the present invention;

Figure 2 is a side elevational view, with parts broken away, taken on line 2—2 of Figure 1;

Figure 3 is a perspective view of the scaling device removed from its associated bucket; and Figure 4 is a section on line 4—4 of Figure 1.

Referring to the drawings in detail, the reference numeral 10 has been applied generally to a bucket or similar receptacle. The reference numeral 12 has been applied generally to the fish scaling device, constituting the present invention, which device is adapted to be associated removably with said bucket.

The bucket includes a flat, rectangular bottom 14, integral along opposite sides with upstanding side walls 16 having handles 18 adjacent their upper ends. The bottom wall 14 is also integral or otherwise rigid with a front wall 20 and a back wall 22. The front wall 20 has, in its upper edge, a recess 24, the back wall 22 having a recess 26 aligned with the recess 24.

The scaling device 12 includes a flat, rectangular frame 28, the frame being formed of channel iron or a like material, so as to define on the frame a peripheral, inwardly facing channel (see Figure 3). The frame 28 is provided, at opposite sides thereof, with pivoted hooks 30 engaging pins 32 extending outwardly from side walls 16, thus to hook the scaling device to the upper end of the bucket or receptacle 10, in a position in which it will rest upon the upper edge of the bucket.

Mounted upon the front of the frame is a driving gear 34 rotatable by handle 36, the gear 34 meshing with a smaller gear 38, said smaller gear 38 being in mesh with a second, identically formed gear 38. Thus, rotation of the handle 36 is effective to transmit rotation, in opposite directions, to the gears 38.

The gears 38 are keyed or otherwise secured to the front ends of relatively elongated, parallel, flexible steel shafts or cores 40, said shafts having secured thereto, throughout their lengths, rotary brushes 42. The shafts 40 are extended in parallel relation along opposite sides of the longitudinal center line of the frame 28, and have their inner or rear ends terminating short of the rear end of the frame. Said rear ends of the flexible shafts 40 are rotatably journaled in bearings 44 pivotally connected at 46 to opposite end portions of a cross bar 48. Cross bar 48 is disposed transversely of the shafts 40, the axes of the pivotal connections 46 being disposed normally to the respective axes of rotation of the shafts 40.

Mounted upon opposite ends of the cross bar 48 are eyes 50, receiving guide rods 52, whereby to mount the cross bar 48 for movement longitudinally of the guide rods, in the direction of the length of the flexible shafts 40. The guide rods 52 are connected at one end to the rear end of the frame 28, the other ends of the guide rods terminating short of the front end of the frame and being connected to the inner ends of support rods 54, extending laterally and inwardly from opposite sides of the frame 28.

Integral or otherwise made rigid with the back edge of the cross bar 48, at a location disposed immediately between the opposite ends of the cross bar, is a rearwardly projecting sleeve 56, and secured at one end within said sleeve is a rod 61 which has its other end extended loosely through the back end of the frame 28, and secured thereto by means of a nut 60 or the like. Encircling the rod 61 is a coil spring 58 which has one end connected to the sleeve 56 and the other end connected to the adjacent portion of the frame 28, as shown in Figures 1 and 3. The cross bar 48, rod 61, and spring 58 comprise a tensioning means which is slidably connected to the frame 28 and biases the brushes 42 to their parallel relation position.

The construction which I have devised is such as to permit the flexible steel shafts 40 to be flexed outwardly away from one another, in the direction of the opposite sides of the frame 28, when a fish F of substantial girth is inserted therebetween. In other words, the device accommodates fish of various thicknesses, within, of course, certain predetermined limits.

In use of the device, the bucket 10 is first filled with water W. The fish F is then grasped by its tail and is let down between the rotary brushes 42. After the fish has been fully inserted within the bucket, the hand crank 36 is operated, to rotate the gears 38 in opposite directions. At the same time, the fish is pulled upwardly to a slight extent. With the brushes turning, the fish will be scaled with substantial ease and facility. The fish is pulled upwardly to a sufficient extent finally, as to cause the same to be scaled throughout its length.

It is to be noted that when the fish has been fully scaled, and has been withdrawn from its position between the brushes 42, the spring 58, tending to compress, will return the flexible steel shafts 40, and their associated rotary brushes, to the normally parallel relationship thereof illustrated in the drawings. Each time, however, a fish is inserted between the brushes, and causes the brushes to be sprayed, the guide rods 52 will permit the cross bar 48 to slide in the direction of the front end of the frame, against the restraining action of the spring 58.

It will be readily appreciated that the construction is such as to permit fish widely varying from one another as to size to be scaled without difficulty.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A fish scaling device comprising a frame adapted for mounting on a receptacle, a pair of spaced parallel rotatable brushes having flexible cores and carried by said frame intermediate the sides thereof, each of said brushes having one end journaled in one end of said frame and having the other end connected to means carried by the other end of said frame for rotary movement about its longitudinal axis and for pivotal movement about an axis normal to the axis of the brush, and driving means on said frame operatively connected to said brushes for rotating said brushes.

2. A fish scaling device comprising a frame adapted for mounting on a receptacle, a pair of spaced parallel rotatable brushes having flexible cores and carried by said frame intermediate the sides thereof, each of said brushes having one end journaled in one end of said frame and having the other end connected to tensioning means carried by the other end of said frame for rotary movement about its longitudinal axis and for pivotal movement about an axis normal to the axis of the brush, and driving means on said frame operatively connected to said brushes for rotating said brushes.

3. A fish scaling device comprising a frame adapted for mounting on a receptacle, a pair of spaced parallel rotatable brushes having flexible cores and carried by said frame intermediate the sides thereof, each of said brushes having one end journaled in one end of said frame and having the other end connected to tensioning means carried by the other end of said frame for rotary movement about its longitudinal axis and for pivotal movement about an axis normal to the axis of the brush, said tensioning means being slidably connected to said frame and biasing said brushes to their parallel relation position, and driving means on said frame operatively connected to said brushes for rotating said brushes.

4. A fish scaling device comprising an open frame adapted for mounting on a receptacle, a pair of parallel spaced guide rods carried by said open frame and extending longitudinally thereof, a cross bar positioned between said guide rods and having its ends slidably supported on the respective guide rods, a pair of spaced parallel rotatable brushes having flexible cores extending longitudinally of and carried by said frame intermediate the sides thereof, each of said brushes having one end journaled in one end of said frame and having the other end connected to said cross bar for rotary movement about its longitudinal axis and for pivotal movement about an axis normal to the axis of the brush, a spring connecting said cross bar to said other end of said frame and tensioned to urge said cross bar toward said other end of said frame to bias said brushes to their parallel relation position, and driving means on said frame operatively connected to said brushes for rotating said brushes.

References Cited in the file of this patent

UNITED STATES PATENTS

| 935,602 | Grub | Sept. 28, 1909 |
| 1,294,140 | Montgomery | Feb. 11, 1919 |

FOREIGN PATENTS

| 605,823 | France | Feb. 26, 1926 |
| 123,372 | Sweden | Nov. 23, 1948 |